(12) United States Patent
Geng et al.

(10) Patent No.: US 9,615,401 B2
(45) Date of Patent: Apr. 4, 2017

(54) METHODS AND APPARATUS FOR UPDATING A DEVICE CONFIGURATION

(71) Applicant: QUALCOMM Incorporated, San Diego, CA (US)

(72) Inventors: Nieyan Geng, San Diego, CA (US); Gurvinder Singh Chhabra, San Diego, CA (US); Thomas Klingenbrunn, San Diego, CA (US); Shyamal Ramachandran, San Diego, CA (US); Francesco Grilli, La Jolla, CA (US); Uttam Pattanayak, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 44 days.

(21) Appl. No.: 14/099,385

(22) Filed: Dec. 6, 2013

(65) Prior Publication Data

US 2014/0162620 A1  Jun. 12, 2014

Related U.S. Application Data

(60) Provisional application No. 61/735,827, filed on Dec. 11, 2012.

(51) Int. Cl.
*H04W 88/06* (2009.01)
*H04W 8/22* (2009.01)
(Continued)

(52) U.S. Cl.
CPC .......... *H04W 88/06* (2013.01); *G06F 9/4401* (2013.01); *H04L 69/321* (2013.01);
(Continued)

(58) Field of Classification Search
CPC .................................................. H04W 88/06
See application file for complete search history.

(56) References Cited

U.S. PATENT DOCUMENTS 6,192,070 B1  2/2001  Poon et al.
6,785,556 B2  8/2004  Souissi
(Continued)

FOREIGN PATENT DOCUMENTS

CN    1229328 A    9/1999
EP    1928200 A1   6/2008

OTHER PUBLICATIONS

Develop Once Deploy Anywhere: Achieving Adaptivity with a Runtime Linker/Loader Framework, ARM '05 Proceedings of the 4th workshop on Reflective and adaptive middleware systems, RM '05, Nov. 28-Dec. 2, 2005, Grenoble, France, Mukherjee and Varadarajan.*

(Continued)

*Primary Examiner* — Vladimir Magloire
*Assistant Examiner* — David Orange
(74) *Attorney, Agent, or Firm* — Patterson & Sheridan, L.L.P.

(57) ABSTRACT

Methods and apparatus are provided for device configuration (e.g., feature segment loading and system selection). Certain aspects of the present disclosure generally relate to operating a user equipment (UE) in a first radio access network (RAN) with a first set of modem features that supports the first RAN, detecting a second RAN not supported by the first set of modem features, and rebooting the modem software to load a second set of modem features that supports the detected RAN. For certain aspects, the first RAN may be a Time Division-Synchronous Code Division Multiple Access (TD-SCDMA) network and the second RAN may be a Wideband-Code Division Multiple Access (W-CDMA) network or long term evolution network. This allows features to be loaded into memory (e.g., only) when they are required to support a detected RAN, rather than (Continued)

loading an entire image, thereby conserving DRAM and increasing efficiency.

24 Claims, 10 Drawing Sheets

(51) Int. Cl.
    *G06F 9/44*     (2006.01)
    *H04L 29/08*     (2006.01)
    *H04M 1/725*     (2006.01)
    *H04W 48/18*     (2009.01)

(52) U.S. Cl.
    CPC ......... *H04M 1/72525* (2013.01); *H04W 8/22* (2013.01); *H04W 48/18* (2013.01)

(56) References Cited

U.S. PATENT DOCUMENTS

| | | |
|---|---|---|
| 8,009,605 B1 | 8/2011 | Snodgrass |
| 8,285,324 B2 | 10/2012 | Toon |
| 2002/0137514 A1* | 9/2002 | Mitsugi et al. ............... 455/436 |
| 2004/0098715 A1* | 5/2004 | Aghera .................... G06F 8/65 717/173 |
| 2004/0205164 A1* | 10/2004 | Jacobs et al. ................. 709/219 |
| 2005/0180384 A1 | 8/2005 | Jeong et al. |
| 2005/0204353 A1* | 9/2005 | Ji .................................. 717/168 |
| 2006/0010314 A1 | 1/2006 | Xu |
| 2006/0046716 A1* | 3/2006 | Hofstaedter et al. ...... 455/432.2 |
| 2007/0237118 A1 | 10/2007 | Seo |
| 2008/0125167 A1* | 5/2008 | Fujii .......................... 455/552.1 |
| 2009/0203409 A1 | 8/2009 | Castor et al. |
| 2010/0229217 A1* | 9/2010 | Bhatia ............................... 726/4 |
| 2011/0243119 A1* | 10/2011 | Chin et al. .................... 370/342 |
| 2012/0322502 A1 | 12/2012 | Song et al. |

OTHER PUBLICATIONS

International Search Report and Written Opinion—PCT/US2013/073834—ISA/EPO—May 9, 2014.

* cited by examiner

METHODS AND APPARATUS FOR UPDATING A DEVICE CONFIGURATION

CLAIM OF PRIORITY UNDER 35 U.S.C. §119

This application claims benefit of U.S. Provisional Patent Application Ser. No. 61/735,827, filed Dec. 11, 2012, which is herein incorporated by reference in its entirety.

BACKGROUND

Field

Certain aspects of the present disclosure generally relate to device configuration and, more particularly, to methods and apparatus for updating a device configuration (e.g., loading a feature set to support a radio access technology (RAT) based on a determination that the RAT is not currently supported).

Background

Devices are evolving over time to support numerous configurations (e.g., hardware and/or software configurations). Typically, once a device is configured, it may not easily adapt to a change in an operating environment of the device.

Further, wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM®) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM® infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies, not only to meet the growing demand for mobile broadband access, but to advance and enhance the user experience with mobile communications.

SUMMARY

Certain aspects of the present disclosure provide techniques, corresponding apparatus, and program products, for updating a device configuration (e.g., loading a feature set to support a radio access technology (RAT) based on a determination that the RAT is not currently supported).

Certain aspects of the present disclosure generally relate to operating a user equipment (UE) in a first radio access network (RAN) with a first set of modem features that supports the first RAN, detecting a second RAN not supported by the first set of modem features, and rebooting the modem software to load a second set of modem features that supports the detected RAN. For certain aspects, the first RAN may be a Time Division-Synchronous Code Division Multiple Access (TD-SCDMA) network and the second RAN may be a Wideband-Code Division Multiple Access (W-CDMA) network or LTE (e.g., long term evolution wireless communications in compliance with 3GPP standards) network. This allows features to be loaded into memory (e.g., only) when they are required to support a detected RAN, rather than loading an entire image, thereby conserving DRAM and increasing efficiency.

In an aspect of the disclosure, a method for wireless communications by a user equipment (UE) is provided. The method generally includes operating in accordance with a first modem feature set loaded into memory that supports at least a first radio access technology (RAT), detecting potential availability of at least a second RAT not supported by the first modem feature set; and in response, taking one or more actions to cause a device to reset and, during or after a boot procedure, updating memory to include a second modem feature set that supports the second RAT, the second modem feature set selected from a single device image that includes the first modem feature set.

In an aspect of the disclosure, a method for device configuration is provided. The method generally includes operating in accordance with a first feature set loaded into memory that supports a first device hardware and software configuration, detecting potential to operate in a configuration different than the first device hardware and software configuration, and in response, taking one or more actions to cause a device to reset and, during or after a boot procedure, updating memory to include a second feature set that supports a second device hardware and software configuration, the second feature set selected from a single device image that includes the first feature set.

In an aspect of the disclosure, a method for wireless communications by a user equipment (UE) is provided. The method generally includes operating in accordance with a first modem feature set loaded into memory that supports at least a first radio access technology (RAT), detecting potential availability of at least a second RAT not supported by the first modem feature set, and in response, taking one or more actions to cause a device to reset and, during or after a boot procedure, updating memory to include a second modem feature set that supports the second RAT, wherein the second modem feature set is a selected subset of a data item stored in a file system on the UE after the boot procedure.

In an aspect of the disclosure, a method for device configuration is provided. The method generally includes operating in accordance with a first feature set loaded into memory that supports a first device hardware and software configuration, detecting potential to operate in a second device hardware and software configuration different than the first device hardware and software configuration, and in response, taking one or more actions to cause a device to reset and, during or after a boot procedure, updating memory to include a second feature set that supports the second device hardware and software configuration, wherein the second feature set is a selected subset of a data item stored in a file system on the device after the boot procedure.

In an aspect of the disclosure, an apparatus for device configuration is provided. The apparatus generally includes means for operating in accordance with a first modem feature set loaded into memory that supports at least a first radio access technology (RAT), means for detecting potential availability of at least a second RAT not supported by the first modem feature set, and means for, in response, taking one or more actions to cause a device to reset and, during or after a boot procedure, updating memory to include a second modem feature set that supports the second RAT, the second modem feature set selected from a single device image that includes the first modem feature set.

In an aspect of the disclosure, an apparatus for device configuration is provided. The apparatus generally includes means for operating in accordance with a first feature set loaded into memory that supports a first device hardware and software configuration, means for detecting potential to operate in a second device hardware and software configuration different than the first device hardware and software configuration, and means for, in response, taking one or more actions to cause a device to reset and, during or after a boot procedure, updating memory to include a second feature set that supports the second device hardware and software configuration, wherein the second feature set is a selected subset of a data item stored in a file system on the device after the boot procedure.

Various aspects and features of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
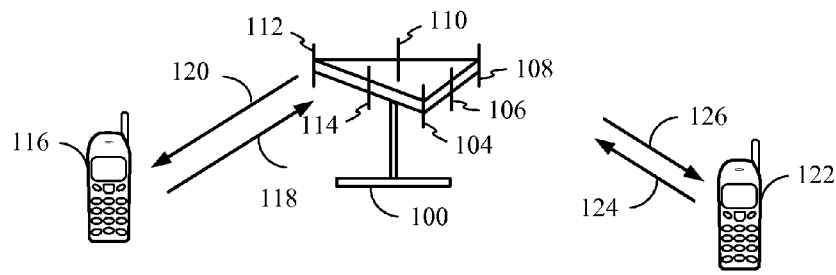
FIG. 1 illustrates an example multiple access wireless communication system, in accordance with certain aspects of the present disclosure.

As mentioned above, devices are evolving over time to support numerous configurations (e.g., hardware and/or software configurations. For example, in order to expand the services available to subscribers, some mobile stations (MSs) support communications with multiple radio access technologies (RATs). For example, a multi-mode MS may support long term evolution for broadband data services and code division multiple access (CDMA) for voice services. As modem features are added to support these services, modem side memory footprint increases as well. However, it is desirable to limit the amount of random access memory (RAM) needed in order to minimize cost. Therefore, a problem to be addressed is how to limit RAM usage, while maintaining features (e.g., modem features).

Techniques and apparatus are presented herein that may help limit the size of RAM, by loading only necessary feature sets into memory (e.g., referred to herein as "segment loading"), such as feature sets necessary to support currently available radio access technologies (RATs) at boot up. During run time, if a different set of features is needed (e.g., to support a different RAT), the system may select the appropriate set and force a boot procedure (e.g., soft reset) so the appropriate set is loaded. Loading features (e.g., only) when needed may allow a smaller size RAM to be employed than would be needed if all feature sets were supported simultaneously.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000®, etc. UTRA includes Wideband-CDMA (W-CDMA) and Low Chip Rate (LCR). CDMA2000® covers IS-2000, IS-95, and IS-856 standards. A TDMA network may implement a radio technology such as global system for mobile communications. An OFDMA network may implement a radio technology such as Evolved UTRA (E-UTRA), IEEE 802.11, IEEE 802.16, IEEE 802.20, Flash-OFDM®, etc. UTRA, E-UTRA, and global system for mobile communications are part of Universal Mobile Telecommunication System (UMTS). A UMTS system may employ a TD-SCDMA standard. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between an evolved Node B eNode B 100 and a user equipment UE 116, 122, but divides uplink and downlink transmissions into different time slots in the carrier. Long term evolution is an upcoming release of UMTS that uses E-UTRA. UTRA, E-UTRA, global system for mobile communications, UMTS, and long term evolution are described in documents from an organization named "3rd Generation Partnership Project" (3GPP). CDMA2000® is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP long term evolution and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated in which procedures described for reducing the time to begin acquisition of wireless networks may be performed. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
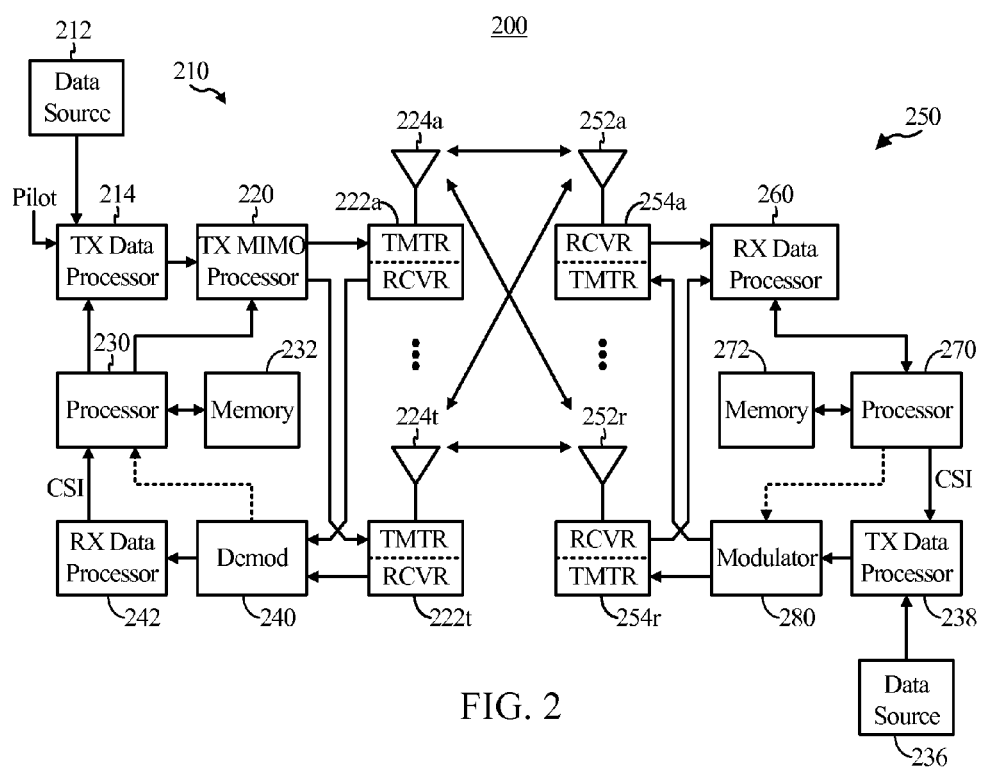
FIG. 2 illustrates a block diagram of an access point and a user terminal, in accordance with certain aspects of the present disclosure.

FIG. 2 illustrates a block diagram of an aspect of a transmitter system 210 (e.g., also known as the access point) and a receiver system 250 (e.g., also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
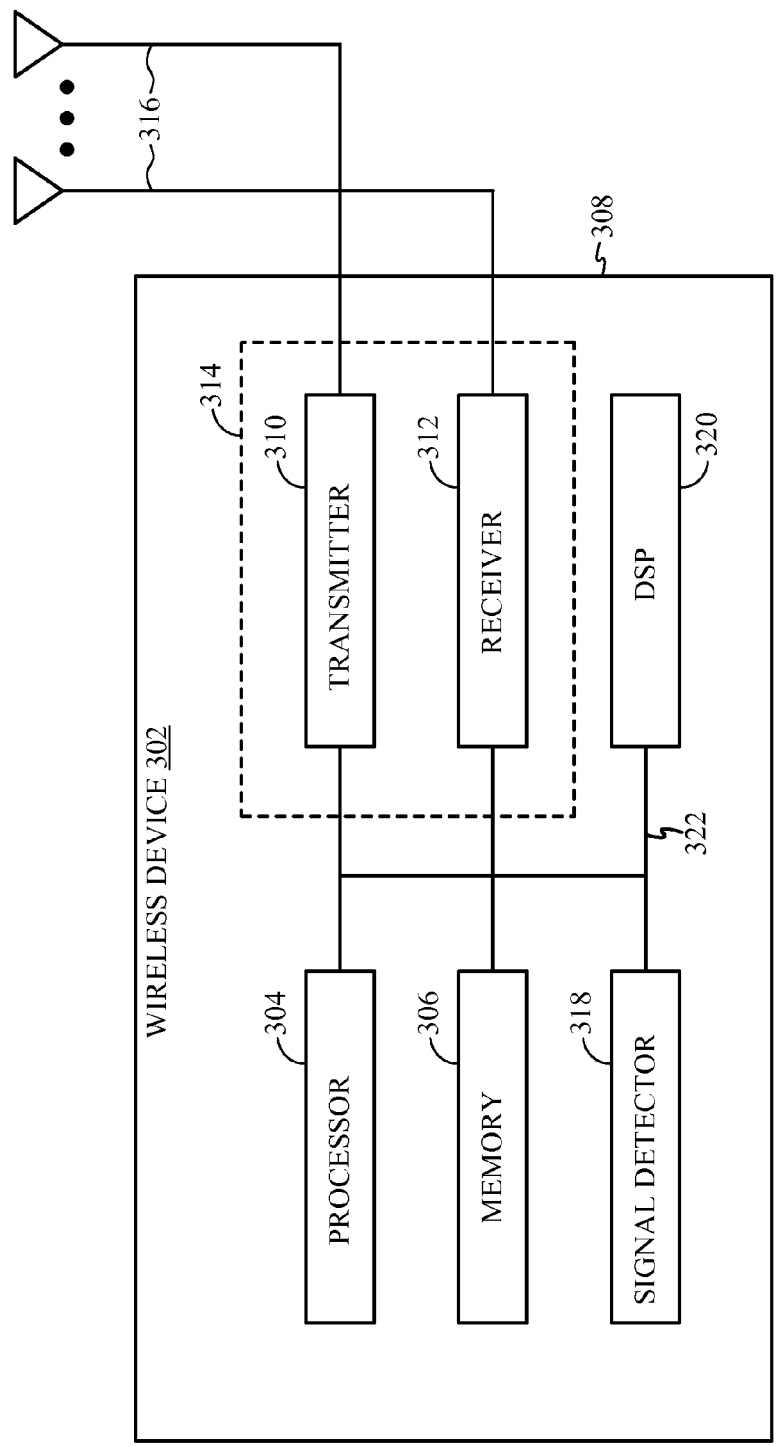
FIG. 3 illustrates various components that may be utilized in a wireless device, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Overlying Radio Access Networks

Figure 4:
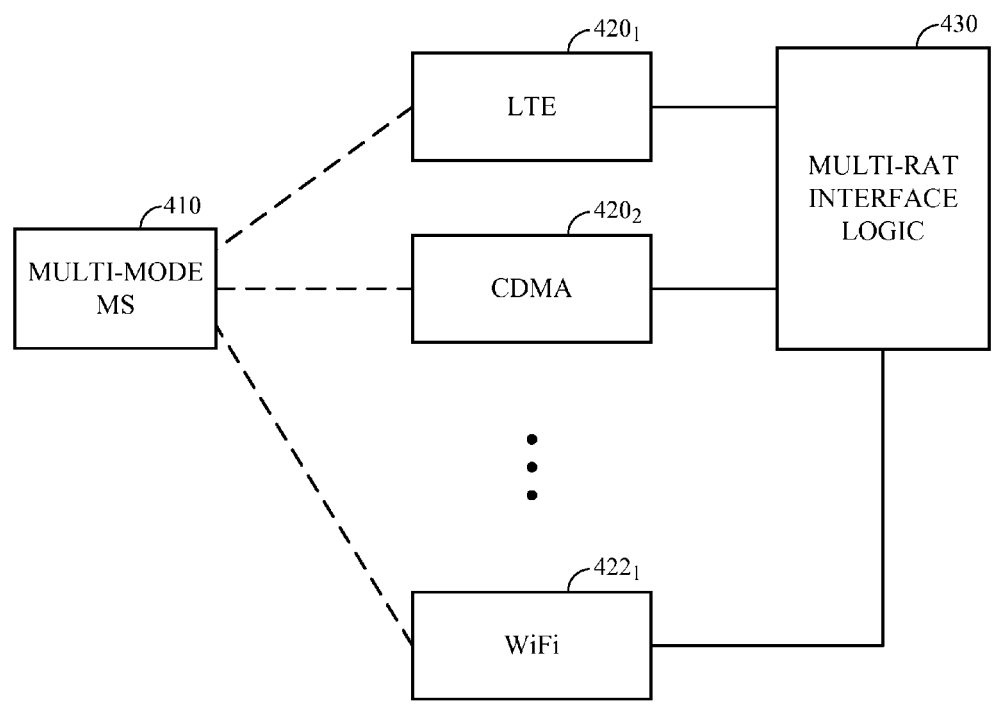
FIG. 4 illustrates an example multi-mode mobile station, in accordance with certain aspects of the present disclosure.

In order to expand the services available to subscribers, some mobile stations (MSs) support communications with multiple radio access technologies (RATs). For example, as illustrated in FIG. 4, a multi-mode MS 410 may support long term evolution for broadband data services and code division multiple access (CDMA) for voice services. Illustratively, long term evolution is shown as a first RAT $420_1$, CDMA is shown as a second RAT $420_2$, and Wi-Fi® is shown as a third RAT $422_1$.

In certain applications, multi-RAT interface logic 430 may be used to exchange information between both long-range and short-range RATs. This may enable a network provider to control how (e.g., through which RAT) an end user of the multi-mode MS 410 actually connects to the network. The interface logic 430 may, for example, support local internet protocol (IP) connectivity or IP connectivity to a core network.

For example, a network provider may be able to direct the multi-mode MS to connect to the network via short-range RAT, when available. This capability may allow a network provider to route traffic in a manner that eases congestion of particular air resources. In effect, the network provider may use short-range RATs to distribute some air traffic (e.g., of a long-range RAT) into a wireless network or to distribute some air traffic from a congested wireless network to a less congested wireless network. The traffic may be re-routed from the short-range RAT when conditions mandate, such as when a mobile user increases speed to a certain level not suitable for a short-range RAT.

Further, since long-range RATs are typically designed to provide service over several kilometers, the power consumption of transmissions from a multi-mode MS when using a long-range RAT is non-trivial. In contrast, short-range RATs (e.g., Wi-Fi®) are designed to provide service over several hundred meters. Accordingly, utilizing a short-range RAT when available may result in less power consumption by the multi-mode MS 410 and, consequently, longer battery life.

In deployment of the Time Division Synchronous CDMA (TD-SCDMA) service, a TD-SCDMA radio access network (RAN) may overlap with one or more networks using other technologies, such as Time Division Duplex (TDD) long term evolution, CDMA 1×RTT (Radio Transmission Technology), Evolution-Data Optimized (EVDO), Wideband CDMA (WCDMA), global system for mobile communications, or Universal Mobile Telecommunications System (UMTS) Terrestrial Radio Access (UTRA). A multimode terminal (MMT)—supporting, for example, TD-SCDMA and global system for mobile communications—may register with both networks to provide services.

Figure 5:
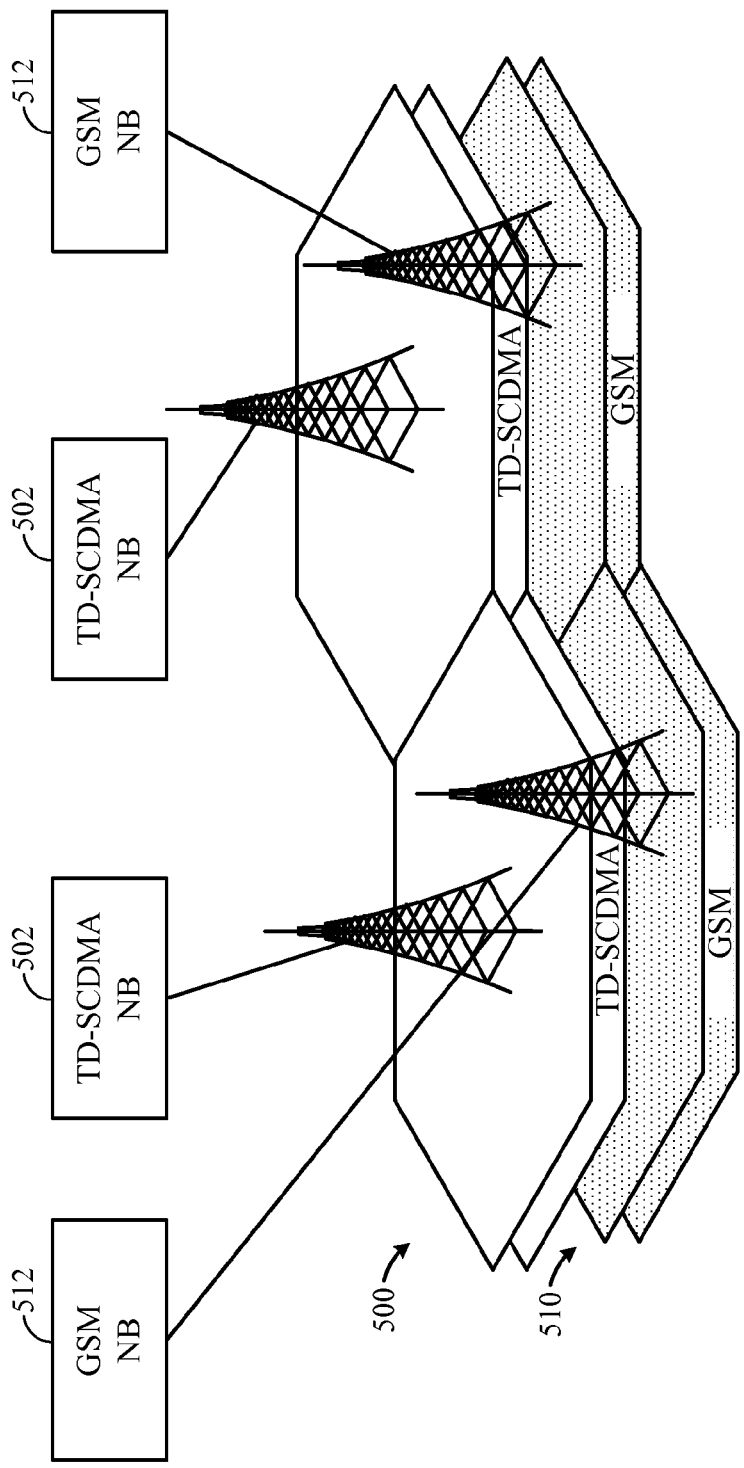
FIG. 5 illustrates an example Time Division Synchronous Code Division Multiple Access (TD-SCDMA) network overlaid on an example global system for mobile communications network, in accordance with certain aspects of the present disclosure.

FIG. 5 illustrates an example TD-SCDMA network 500 overlaid on an example global system for mobile communications network 510, in accordance with certain aspects of the present disclosure. An MMT (not shown) may communicate with either or both networks 500, 510 via TD-SCDMA node Bs (NBs) 502 and/or global system for mobile communications NBs 512. For example, one use case may involve the MMT registering with the global system for mobile communications network 510 for data service and with the TD-SCDMA network 500 for voice call service. Another use case may occur when the MMT has two subscriber identity modules (SIMs): one for global system for mobile communications and another for TD-SCDMA.

Example Modem Feature Set Segment Loading and System Selection

Many features have been added to modems in the past and many more changes are planned in the near future. These changes cause the modem side memory footprint to increase (e.g., the gap between the current modem image footprint and requirements from 9×25 and 8×10 is up to 20 MB). As described above, however, it is generally desirable to limit random access memory (RAM) usage to reduce and/or minimize cost. Various approaches such as Qshrink, compile flag, veneer reduction, etc. have been provided for system level optimization, however, the gap may still be large. Aspects of the present disclosure may help address this issue and limit RAM usage, while maintaining modem feature sets.

Techniques and apparatus are presented herein for loading (e.g., only) necessary feature sets into memory ("segment loading"), such as radio access technologies (RATs) at boot up and selection of a corresponding system.

Segment Loading

Figure 6:
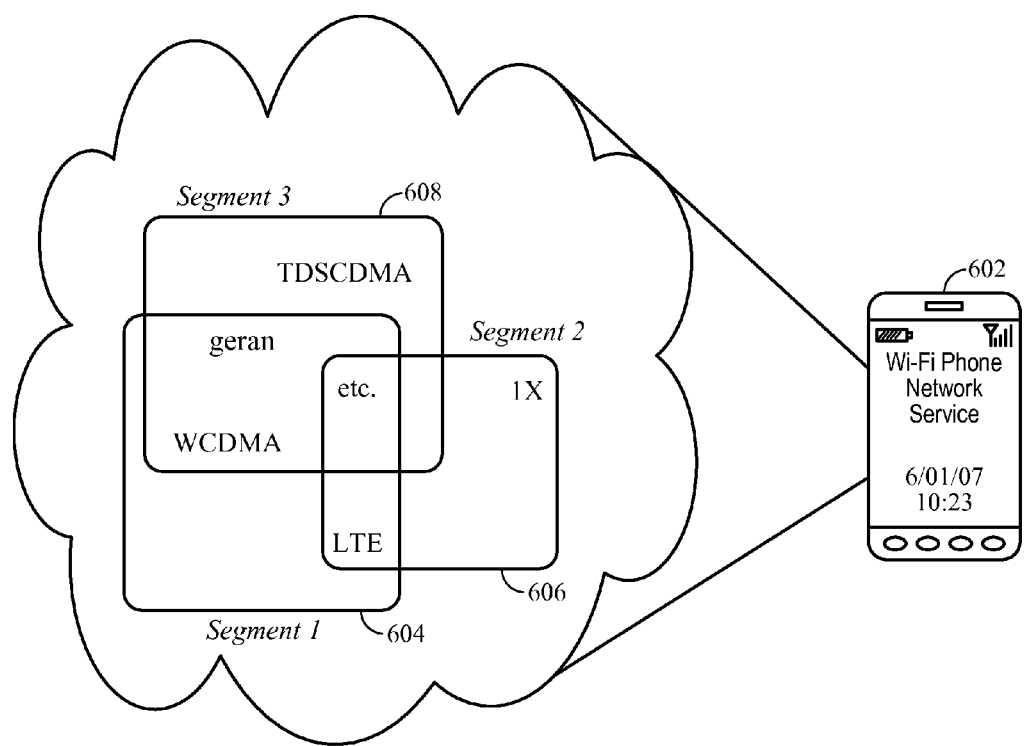
FIG. 6 illustrates an example user equipment (UE) having a device image comprising a base image and feature segments that support one or more radio access technologies (RATs), in accordance with certain aspects of the present disclosure.

According to certain aspects, segment loading may enable a device to load a subset of features and to specify which feature set to be loaded the next time the device resets and boots up. FIG. 6 illustrates an example user equipment (UE) 602 (e.g., similar to multimode MS 410) having a device image comprising a base image and feature segments 604, 606, 608 that support one or more radio access technologies (RATs), in accordance with certain aspects of the present disclosure. A feature segment is a set of features that are run simultaneously on a device, which may be used to support a given RAT. As shown in FIG. 6, segment loading may be performed by partitioning and confining the modem software (SW) based on feature sets. For example, the UE 602 shown in FIG. 6 is partitioned into three segments 604, 606, 608. Since not all modem feature sets need to be active at any given time, during boot up the UE 602 may load only the necessary feature sets into memory. In the example embodiment shown in FIG. 6, each segment 604, 606, 608 may support a set of RATs. For example, Segment 1 604 may support long term evolution, wireless code division multiple access (WCDMA), geran, etc.; Segment 2 606 may support long term evolution, 1×, etc.; and Segment 3 608 may support WCDMA, geran, time division synchronous CSMA (TDSCDMA), etc. For certain embodiments, the UE 602 may be partitioned into any number of segments that may support various different combinations of RATs.

Figure 7:
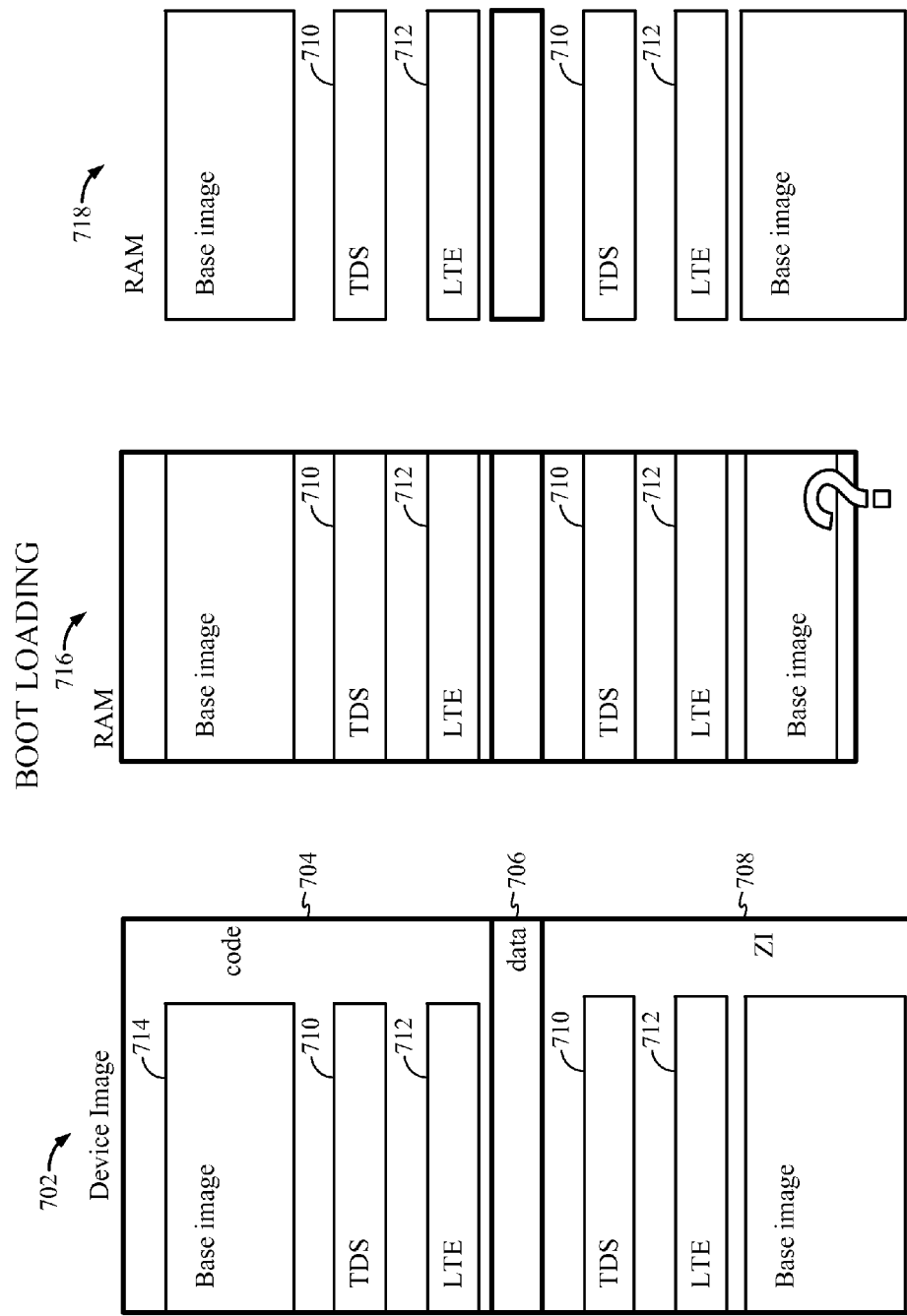
FIG. 7 is a block diagram conceptually illustrating example feature segments that may be loaded into the UE's memory, in accordance with certain aspects of the present disclosure.

FIG. 7 is a block diagram conceptually illustrating example feature segments that may be loaded into the UE's (e.g., UE 602) memory, in accordance with certain aspects of the present disclosure. A device image 702 may consist of code 704, initialized data 706, and zero initialized data (ZI) 708. As shown in FIG. 7, the code 704 and ZI 708 may be grouped by feature (e.g., TDS 710 and long term evolution 712) and all features may be compiled into a single device image 702. The device image 702 may be portioned into a base image 714 and feature segments 710, 712. The device capability may be configured at boot up time by loading the selected feature segments. The feature segments that are not needed at the runtime may not be loaded into SDRAM by the boot loader. Alternatively, such features segments may be loaded into the SDRAM by the boot loader and subsequently removed (e.g., during a configuration step). For certain embodiments, a boot loader or modem boot may only load the code and initialized data in RAM 716 or RAM 718 as shown in FIG. 7. According to certain aspects, a memory management unit (MMU) and/or translation lookaside buffer (TLB) mapping table may be used to select the feature sets to be loaded.

According to certain aspects, some device images may employ an executable and linkable (ELF) format. In an ELF file, the minimum unit that can be recognized and loaded by the boot loader is a program segment, so a feature intended to be independently loaded may be packed into one or more ELF program segments. For some embodiments, small feature sets may be grouped into one feature set. A feature may consist of code, Block Started by Symbol (BSS), and other sections. Each bit of a feature-segment location mask may be used to identify a feature.

According to certain aspects, during a warm boot, a segment-loading mask with desired features to be loaded may be used to check against the feature-segment location mask in order for the boot loader to decide whether a segment-loadable segment should be loaded. For warm boot, the boot loader may use information provided by the modem side to decide whether a segment-loadable segment should be loaded. For example, during the last running session the modem side may decide what feature sets to be loaded next time and packs this information into a 32-bit mask (e.g., segment loading mask). The segment loading mask may be saved such that it is persistent during a warm boot and visible to the boot loader. Then, the modem may request a warm boot. The boot loader may read the segment loading mask and load the base modem image. The boot loader may loop through segments that are marked with a Physically Relocatable flag and may load the segments, for example, based on whether a check of the segment loading mask and feature-segment location mask is TRUE. These segments may be physically relocatable. For certain embodiments, the one or more program segments may be located after the base image in the ELF image. In some aspects, the one or more portions of the base image may be located after a program segment in the ELF image.

For a cold boot, the modem SW runs in a default configuration state with a pre-defined set of segment-loadable features loaded (e.g., pre-defined at compiling). This pre-defined set of segment-loadable features may be marked with a flag of cold boot loaded segment. The boot loading procedure may include; (1) loading all the segments in the basic image; and (2) looping through all the segments that are marked with Physically Relocatable flag and loading the ones with segment type value indicating a cold boot loaded segment.

Once the modem initialization code gets the control from the boot loader, it may map the packed segment-loadable segments to virtual memory to recover the executable image as linked. Since each segment-loadable segment may be mapped, many Translation Lookaside Buffer (TLB) entries are expected. The segment alignment size may affect the number of TLB entries and memory overhead caused by alignment.

In another alternative, the boot loader may not be involved in making the decision how the modem image is loaded and it may load the whole image except the .bss, regardless of cold or warm boot. The modem (e.g., during a blast kernel boot or modem boot up procedure) may be responsible for picking up the right feature at runtime.

In yet another embodiment, segment loadable features may be packed and saved in encrypting file system (EFS). The boot loader may load only the base image. The modem software (SW) may read the segment configuration from persistent storage (e.g., such as non-volatile (NV) or EFS) and then reads, authenticates, and loads the segment features from EFS. The segment loadable features may be stored in an item (e.g., a data file or object). In certain aspects, the modem may employ a subset of features from the item to update the modem configuration.

According to certain aspects, a device may switch between feature segments. The capabilities of the device, or feature sets, may be configured at boot up time. Only the base image and the feature set belonging to a segment may be loaded. At cold boot, the device may boot up with a default configuration (e.g., pre-defined at compile time). However, at device running time, the device may decide that the current configuration is not good (e.g., the device cannot acquire service), and the device may decide to switch to a different configuration. The device may write the desired configuration option into a memory location that is not erased during a boot (e.g., SW-reset). In order to switch to a different segment, and thus other feature sets, the modem processor may reset using a modem sub-system reset and reboot (e.g., this may take about 2 seconds). The boot loader may then load the modem image without knowledge of segment configuration and the modem kernel boot up code may read the segment configuration info saved in the last run and unload the modules not specified in the configuration.

Figure 8:
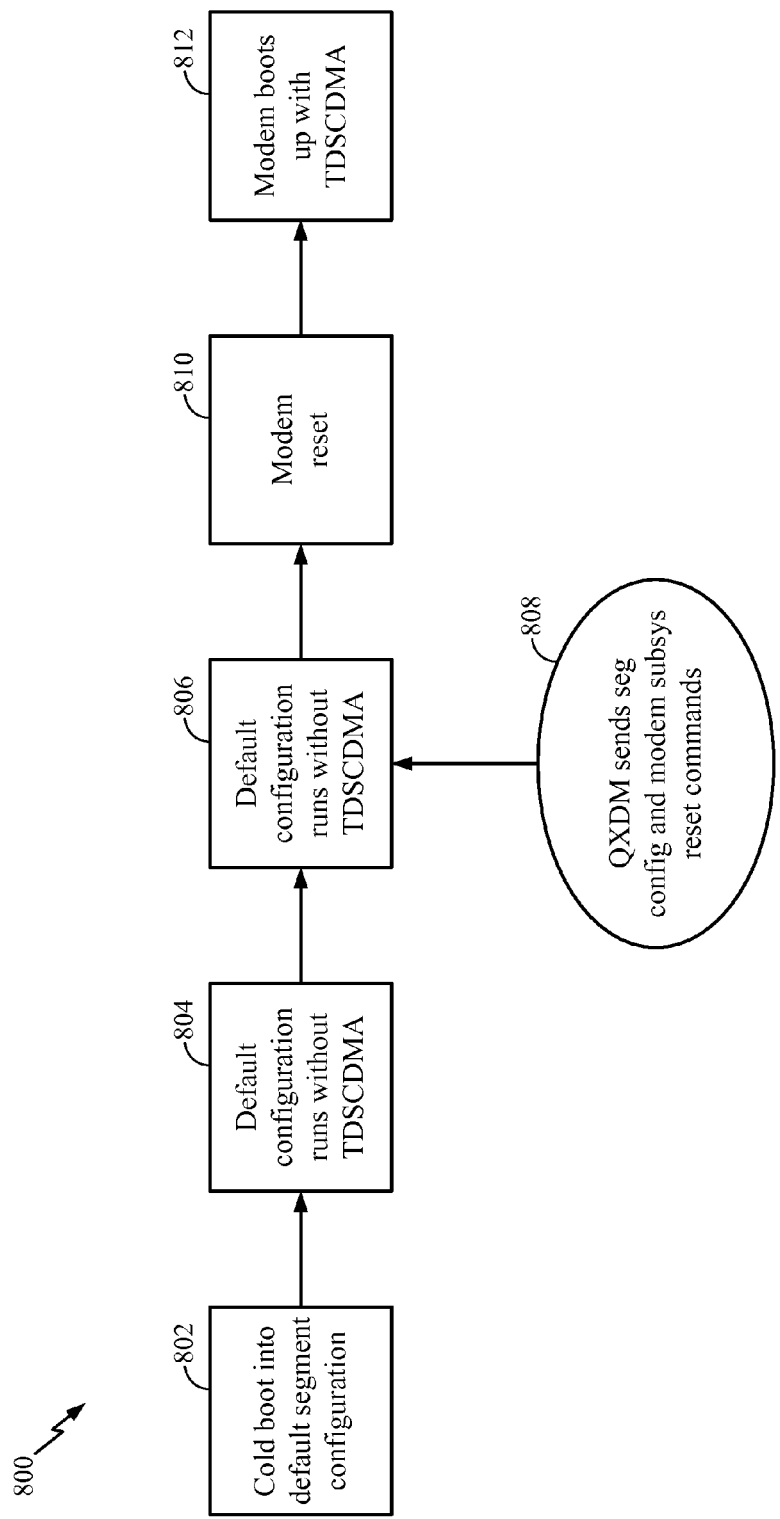
FIG. 8 is a flow diagram illustrating example operations for segment switching by a UE, in accordance with certain aspects of the present disclosure.

In one example of segment switching operations 800 shown in FIG. 8, at 802, a device may be initially (e.g., during cold boot) loaded with one segment configuration, for example, long term evolution and WCDMA, and, at 804 and 806, the device then enters a different region or network where there is no long term evolution or WCDMA network coverage but only a different RAT is available, e.g., TDSCDMA. In this case, at 808-812, the device may reset and load a different segment with features to support TDSCDMA.

System Selection

System selection may be used in a UE that uses segment loading (e.g., such as UE 602) to ensure that the UE is not configured to support all RATs all the time. According to certain aspects, a UE cannot operate in a mode with search capability on all RATs. Therefore, at any given time, the UE may only be configured to support a subset of all RATs that it may support. Selectively eliminating TDSCDMA or WCDMA support, for example, may provide sufficient UE configuration file(s) size reduction. It is also desirable to keep other configurations to a minimum.

In one embodiment, if the UE determines that it is operating in full service in a network which requires TDSCDMA (e.g., for example, China Mobile Communications Corporation (CMCC) network), the UE may ensure that the software (SW) device images contains TDSCDMA but not WCDMA. On the other hand, if the UE determines that it is operating in full service in another network such as WCDMA, the UE may ensure that the SW device image contains WCDMA but not TDSCDMA. If the UE determines that it is out of service or in limited service, the SW image may be toggled heuristically.

Figure 9:
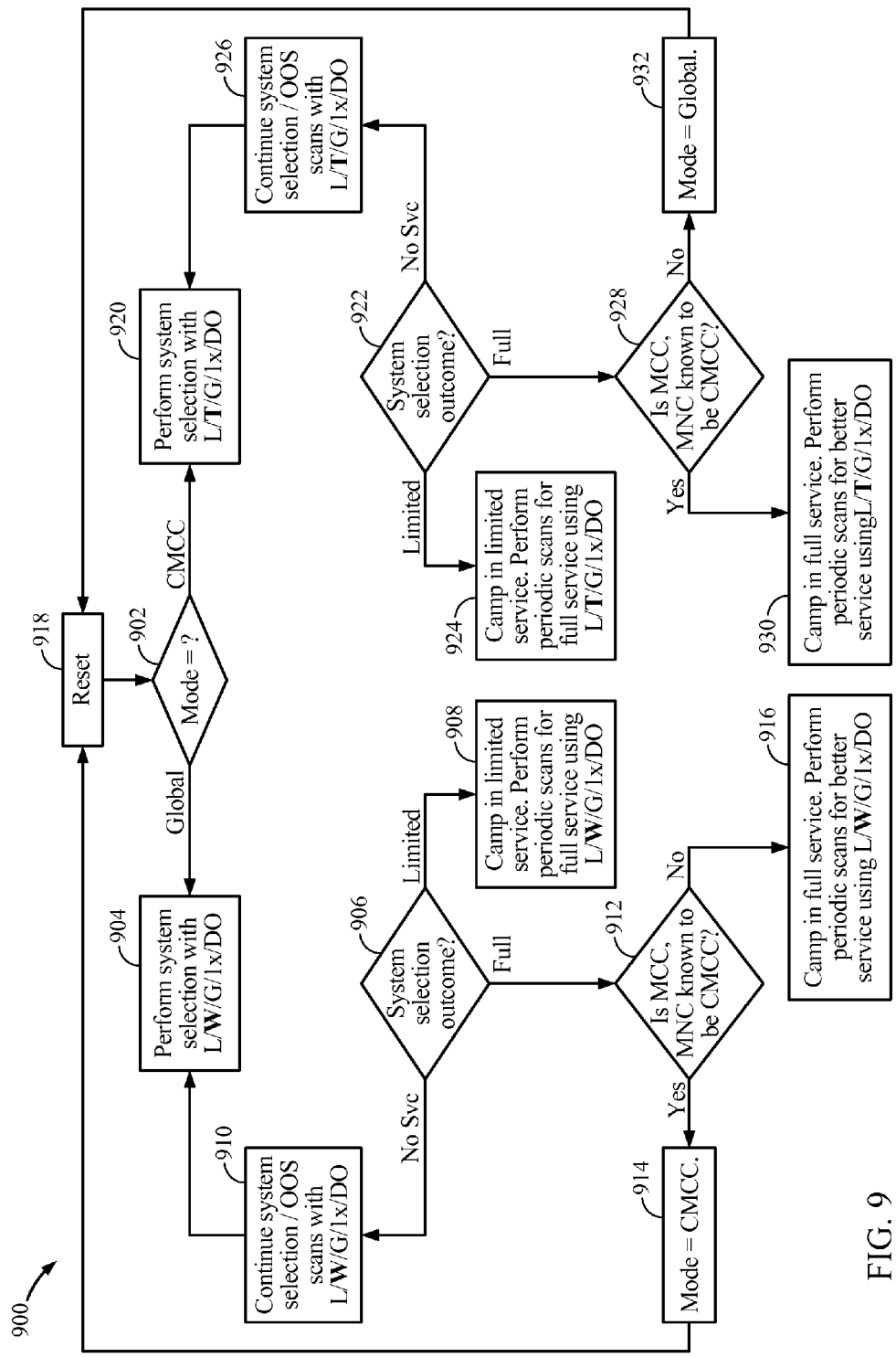
FIG. 9 is a more detailed flow diagram illustrating example operations for segment switching, in accordance with certain aspects of the present disclosure.

FIG. 9 is a flow diagram illustrating example operations 900 for segment switching upon determination that a detected radio access technology (RAT) is not supported by the current configuration, in accordance with certain aspects of the present disclosure. In the example embodiment shown in FIG. 9, at 902, the UE may begin in CMCC or Global network mode. If in a CMCC network mode, at 904, the UE may perform system selection with the loaded features L/T/G/1×/DO (long term evolution/TDSCDMA/Global/CDMA2000® 1×/Data-Optimized). The UE may then determine, at 906, whether it is in full service, no service, or limited service. If the UE is in limited service, at 908, the UE may camp in limited service and performs periodic scans for full service using L/T/G/1×/DO. If the UE is out of service, the UE may repeat system selection at 910. If the UE is in full service, then, at 912, the UE may determine, based on a Mobile Country Code (MCC) or a Mobile Network Code (MNC) detected during the system selection, whether there is a CMCC network. If so, the UE may camp in full service and perform periodic scans for better service at 914. However, if the UE determines, for example, based on the MCC and MNC that it is not in a CMCC network, then, at 916, the UE may reset, at 918, and load in a Global network mode.

If the UE begins in (or is reset and loaded in) the Global network mode or is reset in Global network mode, then, at 920, the UE may perform system selection with the loaded features L/W/G/1×/DO (long term evolution/WCDMA/Global/CDMA2000® 1×/Data-Optimized). The UE may then, at 922, determine whether it is in full service, no service, or limited service. If the UE is in limited service, at 924, the UE may camp in limited service and performs periodic scans for full service using L/W/G/1×/DO. If the UE is out of service, at 926, the UE may repeat system selection. If the UE is in full service, then, at 928, the UE may determine based on a Mobile Country Code (MCC) or a Mobile Network Code (MNC) detected during the system selection whether there is a CMCC network. If so, at 930, the UE may camp in full service and perform periodic scans for better service. However, if the UE determines, at 932, based on, for example, the MCC and MNC that it is not in a CMCC network, then, at 918, the UE may reset and load in a CMCC network mode.

Figure 10:
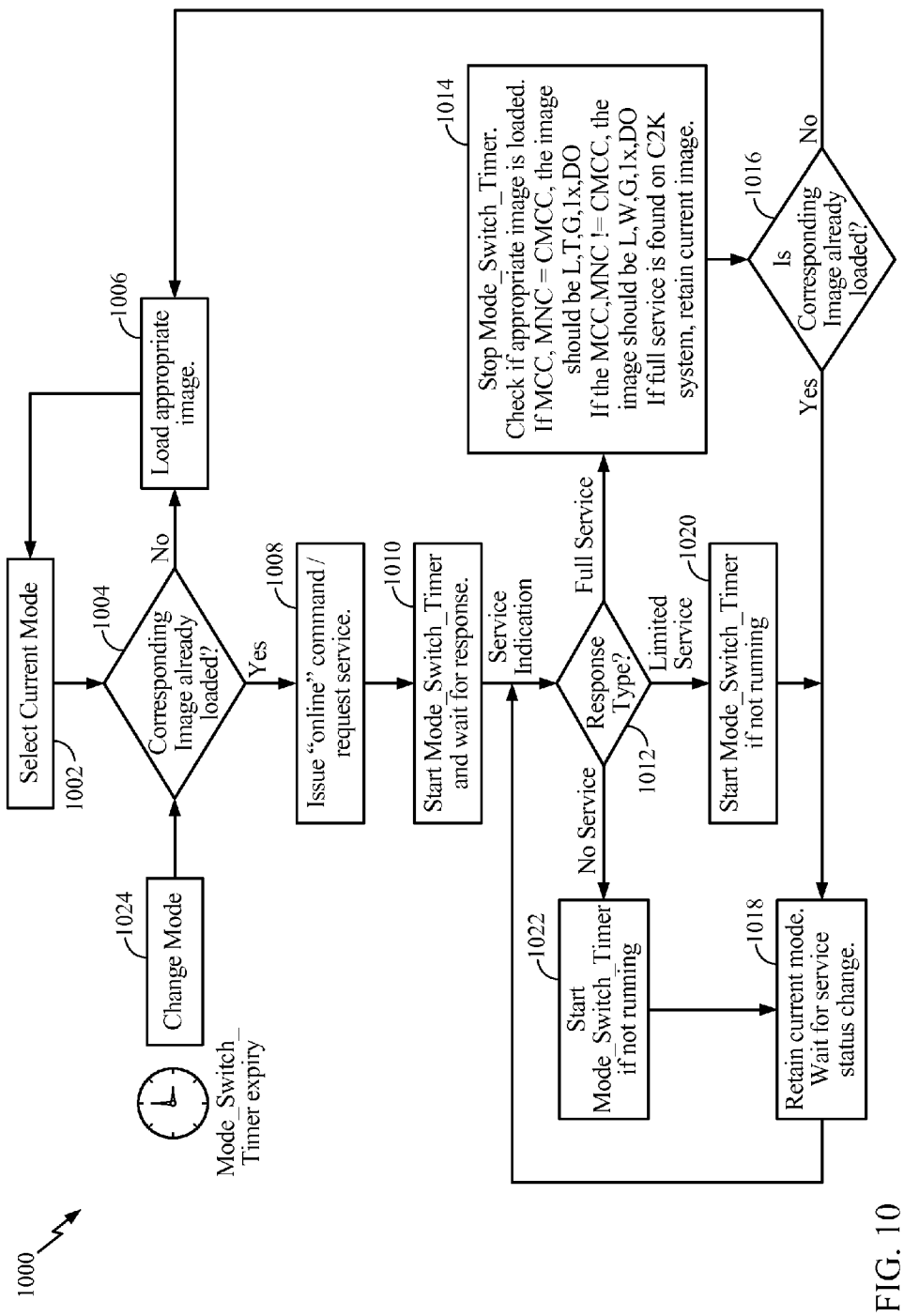
FIGS. 10 and 11 are flow diagrams illustrating example operations for segment switching, in accordance with certain aspects of the present disclosure.

FIG. 10 is a flow diagram illustrating example operations 1000 for segment switching upon determination that a detected radio access technology (RAT) is not supported by the current configuration based on a period of limited or no service, in accordance with certain aspects of the present disclosure. As shown in FIG. 10, a mode may initially be selected at 1002. The UE may then, at 1004, determine whether an image corresponding to features for the selected mode have already been loaded. If not, the appropriate image may be loaded at 1006. If the corresponding image has been loaded, then, at 1008, an "online" command may be used and a request for service sent. A Mode_Switch_Timer may be started, at 1010, and may run based on a service indication—that may be determined at 1012. For example, if a full service indication is received, then, at 1014, the timer may be stopped and it will be determined, at 1016, whether the correct image is loaded (e.g., if MCC, MNC=CMCC, the image should be L, T, G, 1×, DO and if MCC, MNC does not equal CMCC, the image should be L, W, G, 1×, DO). If the correct image is not loaded, then the process is restarted at 1006. If the correct image is loaded, then, at 1018, the current mode is retained and the system waits for service to change at 1012. Returning now to service indication at 1012, if limited or no service is indicated, at 1020 and 1022, respectively, the timer may continue to run and the system waits for service status to change at 1012. If full service is not detected prior to expiration of the timer, then, at 1024, the mode may be changed and the process may restart at 1004.

According to certain aspects, if limited service is reported on 3GPP public land mobile network (PLMN) and it is determined that the UE is not in a region that supports TDSCDMA (e.g., China or Hong Kong), the UE may perform future periodic searches for full service only in the Global mode. For certain embodiments, if the UE is out of service despite having scanned for service using both modes, the toggling between modes may be stopped or slowed down even further.

Figure 11:
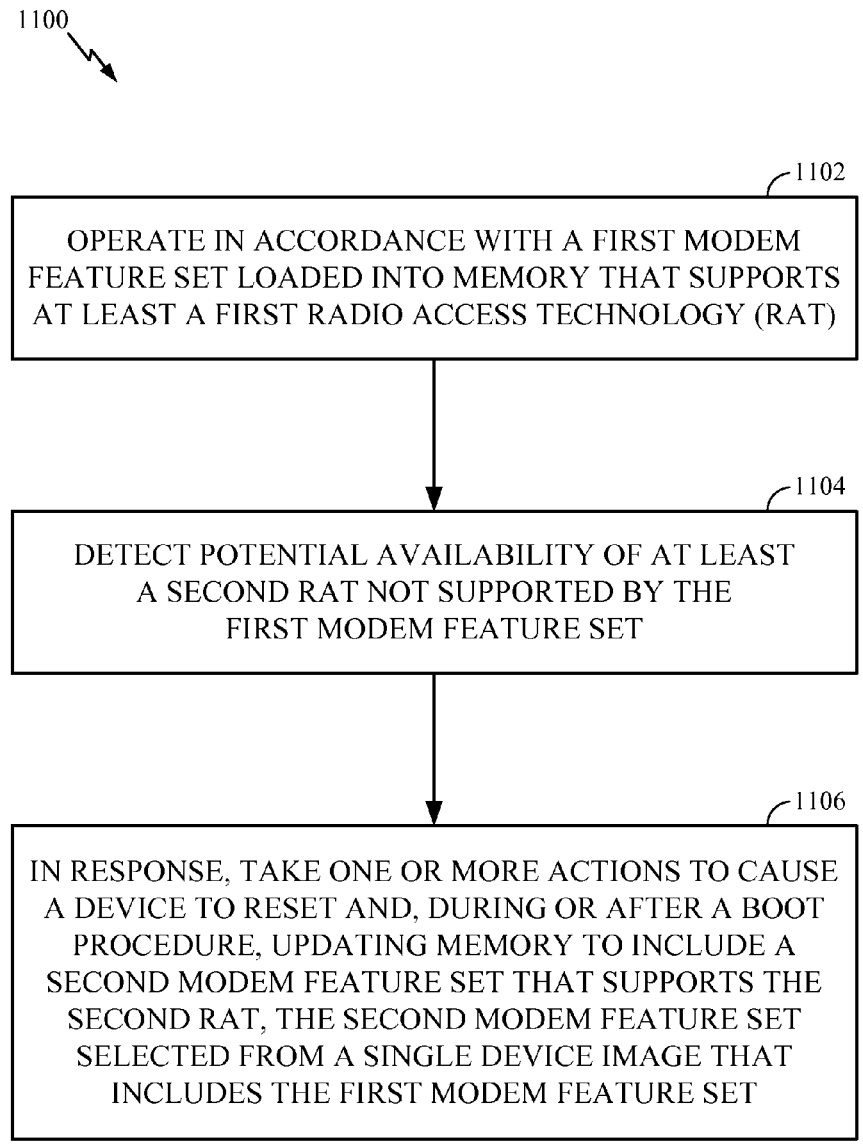

FIG. 11 is a flow diagram illustrating example operations 1100 for segment switching upon determination that a detected radio access technology (RAT) is not supported by the current configuration, in accordance with certain aspects of the present disclosure. The operations 1100 may be performed, for example, by a UE (e.g., UE 602). The operations 1100 may begin, at 1102, by operating in accordance with a first modem feature set loaded into memory that supports at least a first RAT (e.g., TD-SCDMA or W-CDMA).

At 1104, the UE may detect potential availability of at least a second RAT (e.g., TD-SCDMA or W-CDMA) not supported by the first modem feature set. For example, the UE may perform system selection based on the first feature set and determine whether the first RAT is available based on a MCC or MNC. Alternatively, the UE may start a timer if the system selection results in limited service or no service and may determine that the first RAT is not available if the timer expires without achieving full service.

At 1106, in response to detecting availability of the second RAT, the UE may take one or more actions to cause a device to reset and, during a boot procedure, updating memory to include a second modem feature set that supports the second RAT, the second modem feature set selected from a single device image that includes the first modem feature set. In aspects, the first modem feature set may support the first RAT in full service mode and support the second RAT in limited service mode.

According to certain aspects, the memory may be updated (e.g., by writing one or more values to a memory location that is not erased during the reset) to include the second modem feature set, but not the first modem feature set. According to certain aspects, the single device image may be partitioned into a base image, a first segment having the first modem feature set, and a second segment having the second modem feature set. Alternatively, the device image may be partitioned into any number of feature segment sets. For example, the device image may be partitioned further into a third segment and the memory may be updated to include the third modem feature set, but not the first modem feature set.

According to certain aspects, values written to a memory location may indicate a configuration used during a modem boot up procedure to decide whether a segment-loadable segment corresponding to a given feature set should be loaded. The values may indicate a modem feature set different than the first modem feature set to be used by the UE. The values may be a feature-segment location mask used by a boot loader to decide whether a segment-loadable segment corresponding to a given feature set should be loaded. For certain embodiments, the mask may be provided by a modem of the UE.

Although example methods and apparatus are described above with reference to RATs, the present methods and apparatus may apply broadly to other types of device configuration. In aspects, apparatus and methods for device configuration including operating in accordance with a first feature set loaded into memory that supports a first device hardware and software configuration, detecting potential to operate in a configuration different than the first device hardware and software configuration, and in response, taking one or more actions to cause a device to reset and, during or after a boot procedure, updating memory to include a second feature set that supports a second device hardware and software configuration, the second feature set selected from a single device image that includes the first feature set are provided.

Further, in aspects, in addition to or as an alternative to boot loader configuration, a modem boot loader and/or software after a boot process completes may be employed to configure the device. For example, in aspects, apparatus and methods for wireless communications by a user equipment (UE) including operating in accordance with a first modem feature set loaded into memory that supports at least a first radio access technology (RAT), detecting potential availability of at least a second RAT not supported by the first modem feature set, and in response, taking one or more actions to cause a device to reset and, during or after a boot procedure, updating memory to include a second modem feature set that supports the second RAT, where the second modem feature set is a selected subset of a data item stored in a file system on the UE after the boot procedure, are provided.

Further, in aspects, apparatus and methods for device configuration including operating in accordance with a first feature set loaded into memory that supports a first device hardware and software configuration, detecting potential to operate in a second device hardware and software configuration different than the first device hardware and software configuration and in response, taking one or more actions to cause a device to reset and, during or after a boot procedure, updating memory to include a second feature set that supports the second device hardware and software configuration, where the second feature set is a selected subset of a data item stored in a file system on the device after the boot procedure, are provided.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing long term evolution (in FDD, TDD, or both modes), LTE-Advanced (LTE-A) (in FDD, TDD, or both modes), CDMA2000®, Evolution-Data Optimized (EV-DO), Ultra Mobile Broadband (UMB), IEEE 802.11 (Wi-Fi®), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications by a user equipment (UE), comprising:
    operating with a first loadable Executable and Linkable Format (ELF) segment corresponding to a first modem feature set, that supports at least a first radio access technology (RAT), loaded into a first memory of the UE from a single modem image that includes a second loadable ELF segment corresponding to a second modem feature set that supports a second RAT not supported by the first modem feature set, wherein:
        the single modem image is partitioned at least into a base image, the first loadable ELF segment, and the second loadable ELF segment; and
        the single modem image is stored in a second memory of the UE;
    detecting availability of at least the second RAT that is not supported by the first modem feature set;
    writing one or more values to a memory location of the UE that is not erased during a boot procedure of the modem, wherein the one or more values indicate whether a loadable ELF segment should be included in the first memory;
    in response to the detection, taking one or more actions to cause a modem of the UE to reboot;
    during a first boot procedure of the modem:
        loading, by a boot loader, the single modem image, into the first memory; and
    during a second boot procedure of the modem:
        selecting, by a blast kernel boot loader, the second loadable ELF segment based on the one or more values; and
        unloading, by the blast kernel boot loader, the first loadable ELF segment from the first memory.

2. The method of claim 1, wherein the single modem image is further partitioned into a third loadable ELF segment corresponding to a third modem feature set that supports a third RAT.

3. The method of claim 1, wherein:
    the one or more values comprise a feature-segment location mask used by the boot loader to decide whether a loadable ELF segment should be loaded into the first memory; and
    the selecting is based on the feature-segment location mask.

4. The method of claim 3, wherein the feature-segment location mask is provided by the modem.

5. The method of claim 1, wherein:
    at least one of the first or second RATs comprise time division synchronous code division multiple access (TD-SCDMA).

6. The method of claim 1, wherein:
    at least one of the first or second RATs comprise at least one of wideband code division multiple access (W-CDMA) or a RAT operating in accordance with a long term evolution wireless standard.

7. The method of claim 1, wherein:
    the at least a first RAT includes at least wideband code division multiple access (W-CDMA); and
    the at least a second RAT includes at least time division synchronous code division multiple access (TD-SCDMA).

8. The method of claim 1, wherein:
the at least a first RAT includes at least time division synchronous code division multiple access (TD-SCDMA); and
the at least a second RAT includes at least wideband code division multiple access (W-CDMA).

9. The method of claim 1, further comprising:
performing system selection, wherein the selected system supports the second RAT and does not support the first RAT; and
determining, based on at least one of a Mobile Country Code (MCC) or a Mobile Network Code (MNC) detected during the system selection, that the second RAT is available.

10. The method of claim 1, further comprising:
performing system selection;
starting a timer if the system selection results in limited service or no service; and
determining the second RAT is available if the timer expires without achieving full service.

11. The method of claim wherein the second RAT not supported by the first modem feature set includes a second RAT not supported for full service mode by the first modem feature set.

12. An apparatus for wireless communications by a user equipment (UE), comprising:
means for operating with a first loadable Executable and Linkable Format (ELF) segment corresponding to a first modem feature set, that supports at least a first radio access technology (RAT), loaded into a first memory of the UE from a single modem image that includes a second loadable ELF segment corresponding to a second modem feature set that supports a second RAT not supported by the first modem feature set, wherein:
the single modem image is partitioned at least into a base image, the first loadable ELF segment, and the second loadable ELF segment; and
the single modem image is stored in a second memory of the UE;
means for detecting availability of at least the second RAT that is not supported by the first modem feature set;
means for writing one or more values to a memory location of the UE that is not erased during a boot procedure of the modem, wherein the one or more values indicate whether a loadable ELF segment should be included in the first memory;
means for, in response to the detection, taking one or more actions to cause a modem of the UE to reboot;
means for during a first boot procedure of the modem:
loading, by a boot loader, the single modem image, into the first memory; and
means for during a second boot procedure of the modem:
selecting, by a blast kernel boot loader, the second loadable ELF segment based on the one or more values; and
unloading, by the blast kernel boot loader, the first loadable ELF segment from the first memory.

13. The apparatus of claim 12, wherein the single modem image is further partitioned into a third loadable ELF segment corresponding to a third modem feature set that supports a third RAT.

14. The apparatus of claim 12, wherein:
the one or more values comprise a feature-segment location mask used by the boot loader to decide whether a loadable ELF segment should be loaded into the first memory; and
the selecting is based on the feature-segment location mask.

15. The apparatus of claim 14, wherein the feature-segment location mask is provided by the modem.

16. The apparatus of claim 12, wherein:
at least one of the first or second RATs comprise time division synchronous code division multiple access (TD-SCDMA).

17. The apparatus of claim 12, wherein:
at least one of the first or second RATs comprise at least one of wideband code division multiple access (W-CDMA) or long-term evolution RAT.

18. The apparatus of claim 12, wherein:
the at least a first RAT includes at least wideband code division multiple access (W-CDMA); and
the at least a second RAT includes at least time division synchronous code division multiple access (TD-SCDMA).

19. The apparatus of claim 12, wherein:
the at least a first RAT includes at least time division synchronous code division multiple access (TD-SCDMA); and
the at least a second RAT includes at least wideband code division multiple access (W-CDMA).

20. The apparatus of claim 12, further comprising:
means for performing system selection, wherein the selected system supports the second RAT and does not support the first RAT; and
means for determining, based on at least one of a Mobile Country Code (MCC) or a Mobile Network Code (MNC) detected during the system selection, that the second RAT is available.

21. The apparatus of claim 12, further comprising:
means for performing system selection;
means for starting a timer if the system selection results in limited service or no service; and
means for determining the second RAT is available if the timer expires without achieving full service.

22. The apparatus of claim 12, wherein the second RAT not supported by the first modem feature set includes a second RAT not supported for full service mode by the first modem feature set.

23. An apparatus, comprising:
a first memory;
a second memory;
at least one processor coupled with the first memory and the second memory and configured to:
operate with a first loadable Executable and Linkable Format (ELF) segment corresponding to a first modem feature set, that supports at least a first radio access technology (RAT), loaded into the first memory from a single modem image that includes a second loadable ELF segment corresponding to a second modem feature set that supports a second RAT not supported by the first modem feature set, wherein:
the single modem image is partitioned at least into a base image, the first loadable ELF segment, and the second loadable ELF segment; and
the single modem image is stored in the second memory;
detect availability of at least the second RAT that is not supported by the first modem feature set;
write one or more values to a memory location of the apparatus that is not erased during a boot procedure of the modem, wherein the one or more values indicate whether a loadable ELF segment should be included in the first memory;
in response to the detection, take one or more actions to cause a modem of the apparatus to reboot;
during a first boot procedure of the modem:

load, by a boot loader, the single modem image, into the first memory; and during a second boot procedure of the modem:
select, by a blast kernel boot loader, the second loadable ELF segment based on the one or more values; and
unload, by the blast kernel boot loader, the first loadable ELF segment from the first memory.

24. A non-transitory computer readable medium having computer executable code stored for wireless communications by a user equipment (UE), comprising:

code for operating with a first loadable Executable and Linkable Format (ELF) segment corresponding to a first modem feature set, that supports at least a first radio access technology (RAT), loaded into a first memory of the UE from a single modem image that includes a second loadable ELF segment corresponding to a second modem feature set that supports a second RAT not supported by the first modem feature set, wherein:

the single modem image is partitioned at least into a base image, the first loadable ELF segment, and the second loadable ELF segment; and the single modem image is stored in a second memory of the UE;

code for detecting availability of at least the second RAT that is not supported by the first modem feature set;

code for writing one or more values to a memory location of the UE that is not erased during a boot procedure of the modem, wherein the one or more values indicate whether a loadable ELF segment should be included in the first memory;

code for, in response to the detection, taking one or more actions to cause a modem of the UE to reboot;

code for during a first boot procedure of the modem:
loading, by a boot loader, the single modem image, into the first memory; and code for during a second boot procedure of the modem:
selecting, by a blast kernel boot loader, the second loadable ELF segment based on the one or more values; and
unloading, by the blast kernel boot loader, the first loadable ELF segment from the first memory.

* * * * *